D. AND J. McCOMB.
AUTOMOBILE TIRE CHAIN.
APPLICATION FILED APR. 2, 1921.

1,391,261.
Patented Sept. 20, 1921.

D. McComb and J. McComb, Inventor

By C. A. Snow & Co.
Attorneys

UNITED STATES PATENT OFFICE.

DAVID McCOMB AND JOHN McCOMB, OF STOUGHTON, WISCONSIN.

AUTOMOBILE-TIRE CHAIN.

1,391,261.      Specification of Letters Patent.     Patented Sept. 20, 1921.

Application filed April 2, 1921. Serial No. 457,985.

*To all whom it may concern:*

Be it known that we, DAVID McCOMB and JOHN McCOMB, citizens of the United States, residing at Stoughton, in the county of Dane, State of Wisconsin, have invented a new and useful Automobile-Tire Chain, of which the following is a specification.

The present invention relates to anti-skid chains, and more particular to a novel means for connecting the adjacent ends thereof, it being the primary object of the invention to provide means for compensating for the movement between the ends of the chain, incident to the sudden stopping or starting of the vehicle supplied with the device.

A further object of the invention is to provide a device of this character which may be readily and easily applied to the vehicle wheel, by persons unfamiliar with mechanics.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1:
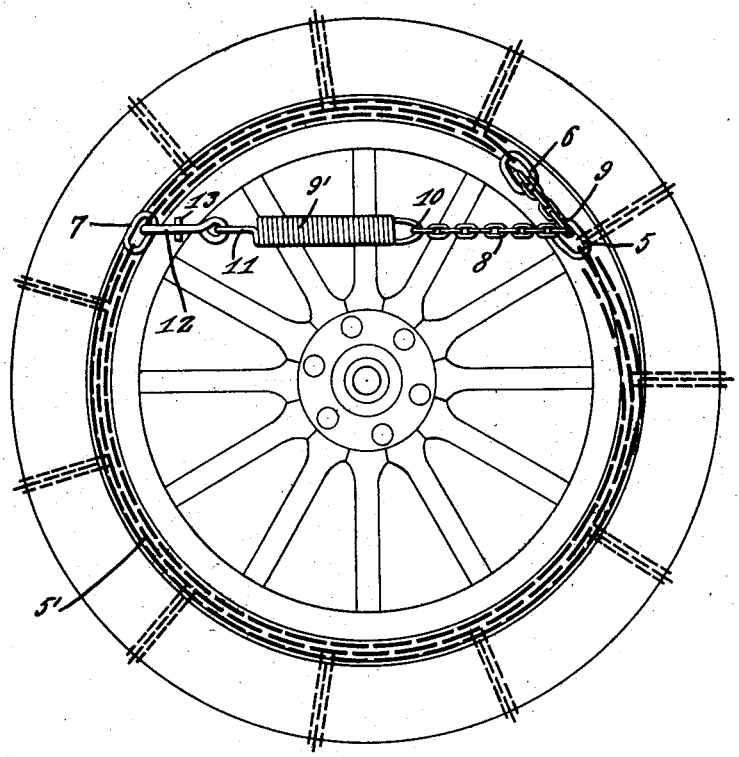
Figure 1 is a side elevational view of a wheel equipped with a device constructed in accordance with the present invention.
Figure 2:
Fig. 2 is a detail view of the hook portion of the device.
Figure 3:
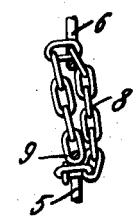
Fig. 3 is a sectional view taken through the end links of the chain and disclosing the manner of attaching the securing chain thereto.

Referring to the drawing in detail, the chain is of the usual construction and includes the chain links 7, the links 5 and 6 constituting the end links of the chain which have connection with the securing device forming the essence of the invention.

Associated with the links is the connecting chain 8, which forms the essence of this invention, and as shown this chain 8 has one end thereof connected to one of the links, as at 9, the opposite end of the chain 8 being connected to the coiled spring 9, as at 10.

The end 11 of the spring 9′ has connection with the hook member 12, which has connection with the chain 5′ as through the link 7, there being provided a locking means 13 provided on the hook member 12 for preventing the accidental displacement of the hook member 12.

In the use of the device, the chain equipped with the connection as described, is positioned on the tire, the intermediate portion of the chain 8 being passed through the link 6, from where the same is passed through the link 5. The hook member 9 is now positioned in its keeper or one of the links 7, to secure the chain 8 in its proper operative position.

From the foregoing it will be obvious that as a sudden pull is directed to the chain, the chain 8 will move slightly within the links 5 and 6, which movement will be compensated for by the expansion and contraction of the coiled spring 9.

It is to be understood however that the securing chain is applied to the chain associated therewith, and is held in such position at all times, that is to say that the chain is never removed from the chain 5′, when the chain is being applied or removed from a vehicle wheel.

It is to be understood that while we have shown and described a securing device applied to an anti-skid chain, at one side thereof, this structure may be duplicated on the opposite side of the chain, however we prefer to use only an ordinary hook construction on the inside of the chain.

To position the chain it is only necessary to place the chain over the upper portion of the wheel, and move the ends thereof into engagement with each other, at a point adjacent to the point of contact with the ground or surface on which the wheel is supported. Thus it will be seen that in applying a chain of this character, the necessity of rolling the wheel over the chain, which is usually laid flat on the surface, is eliminated.

Having thus described the invention, what is claimed as new is:—

1. In combination with links of an anti-skid chain, a securing means including a securing chain having one end thereof connected to one of the end links of the chain, the intermediate portion of the securing chain passing through the adjacent end link of the chain, from where the same is passed through the first mentioned link, and resilient means for connecting the securing chain to the anti-skid chain.

2. In combination with the links of an anti-skid chain, a securing device comprising a securing chain having one end thereof connected to one of the links at one end of the chain, the intermediate portion of the securing chain adapted to be passed through the adjacent end link, from where the chain passes through the first mentioned end link, a coiled spring having connection with the securing chain, a hook member connected to the coiled spring and adapted to be passed through a link intermediate the ends of the anti-skid chain, and means for preventing displacement of the hook member.

In testimony that we claim the foregoing as our own, we have hereto affixed our signatures.

DAVID McCOMB.
JOHN McCOMB.